United States Patent Office 3,378,340
Patented Apr. 16, 1968

3,378,340
PROCESS FOR THE PREPARATION OF
POTASSIUM PHOSPHATE
Jean Martin, Ermont, and Jean René Andrieu, Villiers-le-
Bel, France, assignors to Societe d'Etudes Chimiques
pour l'Industrie et l'Agriculture, Argenteuil, Seine-et-
Oise, France
No Drawing. Filed Feb. 17, 1964, Ser. No. 345,089
Claims priority, application France, Feb. 26, 1963,
926,021
14 Claims. (Cl. 23—106)

ABSTRACT OF THE DISCLOSURE

Producing potassium metaphosphate by reacting phosphoric acid and potassium chloride at the surface of a fused bath containing a predominant amount of potassium metaphosphate, said bath being maintained at about 10–50° C. above the melting point of the bath and within a range of 560–850° C., and being heated by 5–50% of the heat being supplied internally to the body of the bath and the remainder of the heat being supplied externally to the surface of the bath by an overhead burner, said internal heating being conducted by passing a current between two electrodes immersed in said bath.

This invention relates to an improved process for the preparation of potassium metaphosphate from phosphoric acid and potassium chloride.

The formation of metaphosphate by reacting phosphoric acid and potassium chloride is well known and has been studied within a wide temperature range of from 200° C. to more than 1000° C. When equimolar proportions of acid and chloride are used, the reaction can be represented by the following simplified equation:

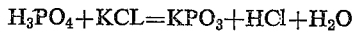

$$H_3PO_4 + KCL = KPO_3 + HCl + H_2O$$

Actually, this reaction does not give a monomer metaphosphate $KPO_3$ but a polyphosphate $(KPO_3)_n$ in which the degree of polymerization $n$ varies according to operating conditions, values of $n$ being reported as low as 2 and as high as 20,000. Hereinafter, the word "metaphosphate" is used for purposes of simplicity, it being understood that this salt is always obtained in a more or less polymerized form.

Potassium metaphosphate is a binary fertilizer of special value owing to its very high content in nutritive elements available for plants: 60.1% $P_2O_5$ and 39.9% $K_2O$ for the pure product. Moreover, because of its low hygroscopicity, potassium metaphosphate has the outstanding advantage of not caking and of remaining free-flowing even under severe climatic conditions; thus it can be readily handled and stored.

Many processes at various temperatures have been proposed for the manufacture of potassium metaphosphate from phosphoric acid and potassium chloride.

When working with moderate temperatures, for example, a pasty sticky mass is formed at about 300–500° C., and this physical state considerably hinders successful operation; in fact, it is practically impossible to achieve complete reaction and the final product contains some free acid.

To cope with these drawbacks a process has been proposed in which potassium metaphosphate is prepared at moderate temperature (about 400–500° C.) in a rotary kiln with recycling of a large quantity of final product. The reaction then takes place on the surface of moving inert particles thereby avoiding the formation of the sticky phase. However, with this recycling method, the output of the kiln is very low relative to the amount of products in circulation, thereby necessitating high operating expenses which of course detract from the technological advantages of the process. (It is also here to be noted that potassium metaphosphate obtained at moderate temperature is always in the water-insoluble form.)

To avoid the formation of the sticky phase which appears at moderate temperature, potassium metaphosphate can be prepared from phosphoric acid and potassium chloride at elevated temperatures, whereby a molten product is obtained. Thus, it has been proposed to work at a temperature higher than 900° C. with concentrated phosphoric acid; but the very severe corrosion attack caused by reaction products is such a serious drawback that it has heretofore not been able to operate this process on an industrial scale.

It has also been suggested to spray a mixture of KCl and phosphoric acid at a very high temperature (above 1300° C.) into the flame of a burner; but according to this method, the thermal efficiency of the operation is very low, and therefore, the economical value of the process is considerably reduced.

In all elevated temperature processes, potassium metaphosphate is obtained in the molten form, and its water solubility varies, being dependent on the cooling step. It is well known, for example, that molten metaphosphate solidifies in a water-insoluble form when cooled down slowly, whereas it is partially or completely water-soluble when obtained by a more rapid cooling. In this way, various types of fertilizers can be prepared.

The principal object of this invention is to provide an improved process for the production of potassium metaphosphate.

Upon further study of the specification and claims other objects and advantages of the present invention will become apparent.

To achieve the objects of this invention there is provided a process which has the same advantages as the high temperature methods known heretofore, although it is operated at a lower temperature. The rapid and complete reaction of acid and chloride gives a final product in the molten form which is substantially devoid of free acid and is more or less water-soluble according to the cooling method selected.

The process disclosed in the present invention has other outstanding advantages, e.g., the corrosion caused by the reactants is significantly reduced even though the temperature is sufficient to obtain a molten product; consequently, the construction materials of the kiln are more heat-resistant and last longer. Moreover, the thermal efficiency is improved, and the process is particularly amenable to continuous operation.

The process of the present invention comprises reacting phosphoric acid and potassium chloride at the surface of a fused salt bath consisting essentially of potassium metaphosphate maintained in the range of its melting point, by means of heat supplied partly externally to the surface of the bath and partly to the interior of he bath.

Advantageously, the reactants are continuously fed onto a liquid bath of potassium metaphosphate contained in a tank furnace in which the raw materials are introduced at one end and the final product is continuously discharged by overflow at the other end. For the continuous operation, it is preferred that the depth of the fused salt bath be at least 10 cm. and more preferably 15–25 cm.

The external overhead heating of the bath is supplied by any convenient arrangement, preferably either by a burner placed between the bath surface and the furnace roof, or by a radiant roof, or by these two means combined.

The heating of the interior of the bath is preferably effected by the Joule effect, using the fused salt as the electrical resistance. An electrical voltage is applied between the electrodes which are spaced from one another and preferably totally immersed in the bath to prevent them from being too quickly deteriorated by the furnace atmosphere.

Such a combined method of heating has significant advantages. When the liquid bath is heated externally only, for instance by means of a burner, the heat transfer is effected only at the upper surface of the bath, and in order to supply a sufficient quantity of heat to the fused bath, the furnace atmosphere must be at a much higher temperature than that of the bath. When some of the heat is supplied by Joule effect, these drawbacks are practically overcome. As the heat is distributed throughout the molten mass, the heat exchange is very much improved, and this permits, on the one hand, a reduction in the size of the furnace hearth and thereby the size of the furnace itself for a given output, and on the other hand, improves the reaction which is achieved more quickly and more completely at a relatively lower bath temperature. The interior heating of the bath also permits the reduction of the temperature of the furnace atmosphere, thus the walls are much less corroded, particularly near to the upper level of the liquid bath. Moreover, the burner having to supply less heat, the volume of the products of combustion are smaller and thus the hydrogen chloride evolved during the reaction is less diluted.

In practice, the quantity of heat supplied inside the liquid bath is comprised between about 5% and about 50%, and preferably between about 10% and 25% of the total amount of heat required. If the heat supplied by Joule effect is substantially increased, the consumption of electrodes dipped in the bath increases notably. As a consequence the electrodes have to be frequently replaced and the complexity of the apparatus is thereby increased.

The tank furnace is preferably lined with refractory material which is corrosion-proof to reactants. So as to minimize the corrosion of the walls which come in contact with the fused bath the external thermal insulation of the furnace is not very important: for example, only the walls not in direct contact with the fused bath are insulated.

To operate the process of the present invention, there can be used any grade of KCl such as a commercial-grade potassium chloride containing 58 to 60% $K_2O$, and as the other reactant any phosphoric acid, e.g. orthophosphoric acid prepared by electro-thermal or by wet processes, metaphosphoric acid, superphosphoric acid, etc. It is quite obvious that by using an acid having a high $P_2O_5$ content the amount of water to be removed by evaporation during the operation is lower, and thereby the quantity of heat required to achieve the reaction is also decreased. Hence, an acid having a $P_2O_5$ content higher than 25% is preferably used.

It is known that substantially pure potassium metaphosphate melts at about 800° C. It is also known that the presence of certain compounds such as potassium chloride, potassium sulfate, metal oxides (CaO, MgO, $Fe_2O_3$, $Al_2O_3$, $SiO_2$), metal salts ($CaCl_2$, $MgCl_2$, etc.) reduces this melting point significantly. For example, a mixture of metaphosphate-chloride containing 27% KCl melts at 610° C., and a mixture of metaphosphate-sulfate containing 13% $K_2SO_4$ melts at 660° C. By adding to potassium metaphosphate both potassium chloride and sulfate, the melting point decreases down to 560° C. for a mixture containing 32% KCl and 6% $K_2SO_4$. The metal oxides which are present as impurities in wet process phosphoric acid are capable of lowering the melting temperature of potassium metaphosphate down to about 700° C. without further addition of adjuvants.

Satisfactory results can, therefore, be achieved with a liquid bath maintained between about 560° C. and about 850° C. by varying the composition of the fused salt bath. In practice it is advisable not to exceed about 800° C. because around this temperature a slight rise of temperature increases the corrosion inordinately. Furthermore, it is desirable to maintain the temperature of the bath in the range of the melting point of the bath, preferably about 10 to 50° C. above the melting point of the bath.

The total and relative concentration of nutritive elements in the desired fertilizer determines the composition of the reaction mixture, and as explained above, the operating temperature of the furnace depends on this composition.

When a fertilizer having the highest possible concentration in nutritive elements is desired, equimolar proportions of acid and chloride are used. In contrast, to prepare a fertilizer having a lower total concentration but a higher $K_2O/P_2O_5$ ratio (for example of about 1) there are several ways of proceeding. By using a mixture of acid-chloride containing a chloride excess, depending on the desired $K_2O/P_2O_5$ ratio, a fertilizer consisting essentially of a mixture of potassium metaphosphate and chloride is obtained. Sulfuric acid may also be added to raw materials and then a fertilizer containing potassium metaphosphate, potassium sulfate and optionally some chloride is prepared.

The molten potassium metaphosphate leaving the tank furnace solidifies by cooling according to any suitable method. If the cooling is slow, the final product is water-insoluble. By means of a more or less strong cooling the potassium metaphosphate obtained is more or less water-soluble. For example, a totally water-soluble product may be prepared by tapping the molten potassium metaphosphate on a metal conveyor belt or on a rotary drum, one or the other being water-cooled. The solid metaphosphate is then ground and screened to suitable size for its final uses.

The molten product may also be treated according to the known method of feeding it to a spraying apparatus with air circulation so that both cooling and granulating operations are effected simultaneously.

According to the process of the present invention it is therefore possible to prepare various types of fertilizers in the same manufacturing unit and without interrupting the course of the operation.

The gases leave the tank furnace at a high temperature and they contain hydrogen chloride evolved during the reaction. The heat values are recovered by sending these gases into heat exchangers placed at the outlet of the furnace, and preferably the heat thus recuperated is used to preheat the combustion air of the burner. The resultant cooled gases are sent to a usual absorption device, and the aqueous hydrogen chloride solution recovered is a valuable by-product.

Without further elaboration, it is believed that one skilled in the art can, using the preceding description utilize the present invention to its fullest extent. The following preferred specific embodiments are, therefore, to be construed as merely illustrative, and not limitative of the remainder of the specification and claims in any way whatsoever.

Example

A furnace having a rectangular hearth and walls made of silica-alumina bricks, with electro-melted refractory material at the points more susceptible to corrosion, was used.

Externally the furnace was thermally insulated only on those parts which did not come in contact with the fused bath. At one end of the furnace a tap-hole was provided to discharge the liquid final product which overflowed from the fused bath, the overflow level determining the depth of the bath. At the other end of the furnace, a raw material feed pipe was provided, opening just above the surface of the fused bath so as to avoid splashing.

One part of the heat was supplied to the furnace by a burner placed horizontally between the roof and the surface of the fused bath at the end where the raw materials were fed. Additional heat energy was supplied by the Joule effect by means of two graphite bars placed at each end of the bath and totally immersed.

A mixture comprising potassium chloride containing 61.25% $K_2O$ and 1.30% $Na_2O$, and phosphoric acid containing 48.4% $P_2O_5$, 0.26% $SO_3$, 0.12% F and 0.72% $Na_2O$ was prepared in a separate vessel, the proportions of acid and chloride being such that the mixture contained 1 mole of $P_2O_5$ per mole of $(K_2O+Na_2O)$.

For starting the furnace a fused bath was prepared from potassium metaphosphate previously manufactured. The slurry of chloride and acid was then sent onto the fused bath and, when steady state operating conditions were reached, the bath temperature was maintained at about 785° C., 11% of the total quantity of calories being supplied in the liquid mass by Joule effect. After a 120 hour operation, 7164 kg. of potassium metaphosphate were obtained, an average sample of which contained: 56.35% $P_2O_5$, 36.05% $K_2O$ and 1.75% $Na_2O$.

The gases leaving the furnace at a temperature of about 1000° C. passed through an indirect heat exchanger in which they served to preheat the combustion air of the burner up to about 700° C. From the heat exchanger the gases having a temperature of about 400° C. were sent into the hydrogen chloride absorption device.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the production of potassium metaphosphate, which process comprises reacting phosphoric acid and potassium chloride at the surface of a heated fused bath containing a predominant amount of potassium metaphosphate, said fused bath being maintained at a temperature in the range of about 10–50° C. above the melting point of the bath, the improvement in heating said fused bath which comprises externally heating the surface of the bath of potassium metaphosphate, and internally heating the body of the bath, said external and internal heating being accomplished by separate heating means, and wherein about 5–50% of the heating of the bath is accomplished internally.

2. The process of claim 1, wherein about 10–25% of the heating of the bath is accomplished internally.

3. The process of claim 1, wherein the temperature of the fused bath is within about 560–850° C.

4. The process of claim 1, wherein the temperature of the fused bath is within about 650–800° C.

5. The process of claim 1, wherein the phosphoric acid analyzes at least 25% $P_2O_5$.

6. The process of claim 1, wherein the internal heating of the bath is accomplished by passing a current through two electrodes immersed in the bath, utilizing the fused bath as electrical resistance.

7. The process of claim 1, wherein the external heating is accomplished with an overhead burner.

8. The process of claim 7 comprising cooling hot hydrogen chloride gases emanating from the fused bath in indirect heat exchange relationship with air for said overhead burner, thereby preheating said air, and absorbing the resultant cooled hydrogen chloride in an absorber.

9. A process for the production of potassium metaphosphate, which process comprises reacting phosphoric acid and potassium chloride at the surface of a fused bath containing a predominant amount of potassium metaphosphate, said bath being maintained at about 10–50° C. above the melting point of the bath and within a range of 560–850° C., and being heated by 5–50% of the heat being supplied internally to the body of the bath and the remainder of the heat being supplied externally to the surface of the bath by overhead heating means, said internal heating being conducted by passing a current between two electrodes immersed in said bath.

10. The process of claim 9, wherein the process is conducted continuously and the depth of the fused bath is at least 10 cm.

11. The process of claim 10, wherein said depth is 15–25 cm.

12. The process of claim 9, wherein the external heating is accomplished with an overhead burner.

13. The process of claim 12, wherein the temperature of the fused bath is within about 650–800° C.

14. The process of claim 13, wherein about 10–25% of the heating of the bath is accomplished internally.

References Cited

UNITED STATES PATENTS

| | | | |
|---|---|---|---|
| 2,167,757 | 8/1939 | Jelen | 23—106 |
| 2,280,848 | 4/1942 | Pole | 23—106 |
| 2,888,321 | 5/1959 | Baumann | 23—106 X |
| 2,988,439 | 6/1961 | Gloss | 23—106 X |
| 3,049,419 | 8/1962 | Raistrick et al. | 23—106 X |
| 3,132,020 | 5/1964 | Tesche et al. | 23—106 X |

EDWARD J. MEROS, *Primary Examiner.*

OSCAR R. VERTIZ, *Examiner.*

L. A. MARSH, O. F. CRUTCHFIELD,
*Assistant Examiners.*